US007814226B2

(12) United States Patent
Patrick

(10) Patent No.: US 7,814,226 B2
(45) Date of Patent: *Oct. 12, 2010

(54) SYSTEM AND METHOD FOR SUPPORTING SERVICE NETWORKS IN A SERVICE-ORIENTED ARCHITECTURE ENVIRONMENT

(75) Inventor: Paul B. Patrick, Manchester, NH (US)

(73) Assignee: BEA Systems, Inc., Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/857,988

(22) Filed: Sep. 19, 2007

(65) Prior Publication Data

US 2008/0069124 A1 Mar. 20, 2008

Related U.S. Application Data

(60) Provisional application No. 60/826,217, filed on Sep. 19, 2006, provisional application No. 60/826,213, filed on Sep. 19, 2006.

(51) Int. Cl.
*G06F 15/173* (2006.01)
*H04L 12/28* (2006.01)

(52) U.S. Cl. .................. 709/238; 709/242; 370/351

(58) Field of Classification Search ......... 709/238–245, 709/202–204, 223–226; 370/351, 401
See application file for complete search history.

(56) References Cited

U.S. PATENT DOCUMENTS

2006/0047742 A1 * 3/2006 O'Neill et al. ............. 709/203
2006/0268879 A1 11/2006 Xhafa et al.
2007/0011126 A1 1/2007 Conner et al.

OTHER PUBLICATIONS

Request for Comments: 2328, OSPF Version 2, J. Moy, Apr. 1998.*
PCT International Search Report for Application No. PCT/US07/78953 dated Jun. 18, 2008.

* cited by examiner

*Primary Examiner*—Yasin Barqadle
(74) *Attorney, Agent, or Firm*—Fliesler Meyer LLP

(57) ABSTRACT

A system and method for supporting Service Networks in a SOA environment. In accordance with an embodiment, the principles governing the topology of computer networks can be similarly applied to the service space—from small federated Service Segments (or sub-domains), to large public federated Service Domains. At the heart of the Service Network are one or more Service Routers, that are themselves responsible for transparently bridging between federated Service Segments. The Service Routers determine where services reside in the Service Network and, based on routing information gathered through interaction with other Service Routers, Network Routers and other mechanisms, deliver service requests, using optimal routes, from a source Service Segment to the target Service Segment. Working in concert with the Service Router, an Enterprise Service Bus (ESB) can abstract the location of services, and hide the existence of the Service Network from service requestors.

19 Claims, 9 Drawing Sheets

SYSTEM AND METHOD FOR SUPPORTING SERVICE NETWORKS IN A SERVICE-ORIENTED ARCHITECTURE ENVIRONMENT

CLAIM OF PRIORITY

This application claims the benefit of U.S. Provisional Patent Application titled "SYSTEM AND METHOD FOR SUPPORTING SERVICE NETWORKS IN A SOA ENVIRONMENT"; Inventor: Paul B. Patrick; Application No. 60/826,217; Filed Sep. 19, 2006; and U.S. Provisional Patent Application titled "SYSTEM AND METHOD FOR SUPPORTING SERVICE NETWORKS IN A SOA ENVIRONMENT"; Inventor: Paul B. Patrick; Application No. 60/826,213; Filed Sep. 19, 2006; and is related to U.S. Patent Application titled "SERVICE ROUTER FOR USE WITH A SERVICE-ORIENTED ARCHITECTURE ENVIRONMENT"; Inventor: Paul B. Patrick; Application No. Ser. No. 11/857,994; Filed Sep. 19, 2007; and PCT Patent Application titled "SYSTEM AND METHOD FOR SUPPORTING SERVICE NETWORKS IN A SERVICE-ORIENTED ARCHITECTURE ENVIRONMENT"; Inventor: Paul B. Patrick; Application No. PCT/US2007/078953; Filed Sep. 19, 2007, each of which applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention is generally related to enterprise application systems, and service-oriented architecture (SOA), and is particularly related to a system and method for supporting Service Networks in a SOA environment.

BACKGROUND

Service Oriented Architecture (SOA) is becoming one of the main strategies that Information Technology (IT) organizations use to organize their business functions into interoperable, standards-based services, which can in turn be combined and reused quickly to meet the IT organization's business needs. However, as the number of services increase, the overall complexity of the system also increases and, without proper governance and infrastructure, SOA technology can quickly result in a "service explosion" that does not scale well.

As larger enterprises and organizations start to deploy SOA-based solutions, there is a trend to do so in a compartmentalized manner, typically on a project-by-project basis, rather than as one single enterprise-wide scheme. This trend in compartmentalization is driven by a number of factors, including the funding model for various projects, and the need to delegate or contain scope of control for certain projects. In some instances, each of these compartments contains an instance of an Enterprise Service Bus (ESB) at its core, providing an abstraction of location, evolution, and basic transformation capabilities for the services within that compartment. As a result, the concept or future of an enterprise-wide Service Bus, in which all of the services are integrated together, does not reflect the reality of today's SOA deployments. The resulting environment is instead a new era of data silos, wherein the sharing of services is limited to the services that are contained within a compartment. This in turn limits the ability of an enterprise to transform its business and achieve greater agility. This is the area the present invention is designed to address.

SUMMARY

Service Oriented Architecture (SOA)-based services require an infrastructure that can scale to the dimensions of today's computer networks, and that can address connectivity and resilience requirements that are not currently provided by the distributed Enterprise Service Bus (ESB) approach. In accordance with an embodiment, the principles governing the topology of computer networks can be similarly applied to the service space—from small federated Service Segments (or sub-domains), to large public federated Service Domains. At the heart of the Service Network are one or more Service Routers, that are themselves responsible for transparently bridging between federated Service Segments. The Service Routers determine where services reside in the Service Network and, based on routing information gathered through interaction with other Service Routers, Network Routers and other mechanisms (e.g., network routing protocols, and Web Service addressing protocols), deliver service requests, using optimal routes, from a source Service Segment to the target Service Segment. Working in concert with the Service Router, an Enterprise Service Bus (ESB) can abstract the location of services, and hide the existence of the Service Network (in particular, the Service Routers) from service requesters. When compared to the analogy of computer network technology, in accordance with an embodiment the ESB can be considered to play the role of a Service Switch that controls the routing (switching) within a federated Service Segment. The Service Switch is then in charge of delivering service requests to a particular service implementation running within the Service Segment controlled by the Service Switch. If a service is not within the Service Segment, then the Service Switch communicates with a Service Router to ensure proper routing of service requests to the target destination. Several modifications and variations of these and other features will be apparent to the practitioner skilled in the art.

DETAILED DESCRIPTION

Figure 1:
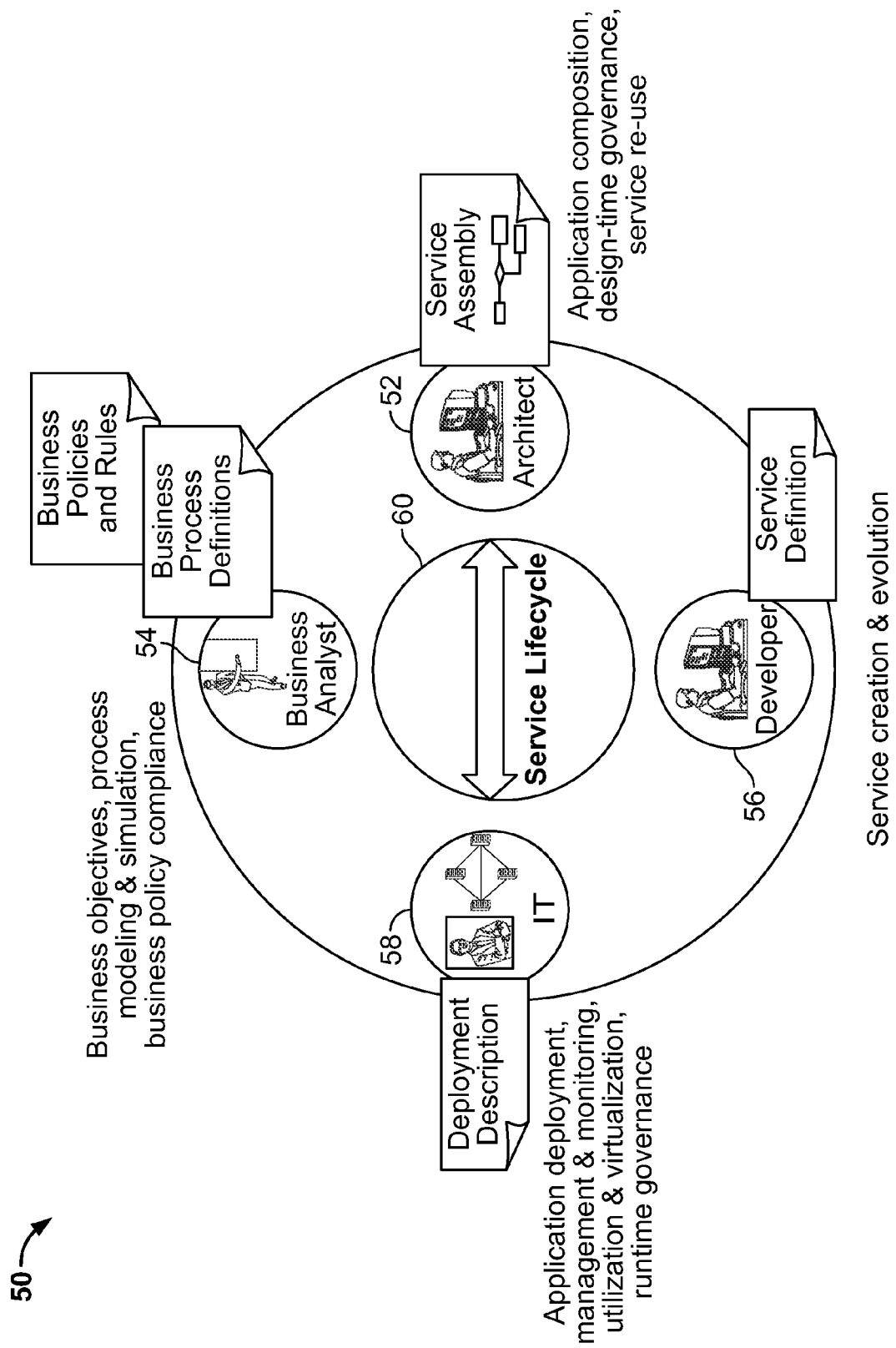
FIG. 1 shows an illustration of a SOA development lifecycle, in accordance with an embodiment.

Service Oriented Architecture (SOA) is becoming one of the main strategies that Information Technology (IT) organizations use to organize their business functions into interoperable, standards-based services, which can in turn be combined and reused quickly to meet the IT organization's business needs. However, as the number of services increase, the overall complexity of the system also increases and, without proper governance and infrastructure, SOA technology can quickly result in a "service explosion" that does not scale well. As an enterprise begins to leverage the power of Service Oriented Architecture and attempts to share services located in different compartments, they find themselves faced with the task of having to configure a considerable amount of low-level infrastructure, typically in the form of queues that are necessary to interconnect the various Service Bus instances. They can also define pieces of configuration information that describe the route that a request will make between one instance of a Service Bus and another. This "routing configuration" complexity grows as the number of compartments increases and still results in a point-to-point scenario, but now between the Service Bus instances both within a compartment, and across compartments. While this approach may provide the ability to ensure that a request is only delivered once to a particular destination, it also creates a situation where a request may remain in a queue for considerable periods of time since the path to the destination may not be available. This can be especially true if the path a request must follow must go through another compartment before reaching its destination. These types of multi-hop scenarios typically require that the operations staff of multiple components must jointly share the routing capabilities and results in a situation where the impact of a failure or overload condition in an intermediary compartment is felt across the enterprise.

Service Oriented Architecture (SOA)-based services require an infrastructure that can scale to the dimensions of today's computer networks, and that can address connectivity and resilience requirements that are not currently provided by the distributed Enterprise Service Bus (ESB) approach. In accordance with an embodiment, a system, method, and infrastructure, referred to herein as a Service Network, is provided that can support an every-growing network of services. Embodiments can also provide dynamic routing, to allow alternate paths to a destination to be found based on cost, availability, and congestion, and context.

A Service Network can be built using techniques that have been similarly applied to computer network technology. For example, the Internet-based Domain Naming Space (DNS) and its constituent routers are able to understand services protocols and can deal with network failure conditions to find the best route for sending Internet-based requests to the preferred places offering the corresponding information. In accordance with an embodiment, the principles governing the topology of computer networks can be similarly applied to the service space—from small federated Service Segments (or sub-domains), to large public federated Service Domains.

As with a typical computer network, the Service Network is designed to support the concept of "scale-free" networks, wherein some of the nodes in the network are more intelligent that others. It is also designed to follow the principle of Separation of Concerns, to ensure that an entity has a single purpose and that the entity is not responsible for attempting to address too many concerns. These principles, which are currently used in today's computer networks, can also be used to build a scalable Service Network architecture.

In accordance with an embodiment, at the heart of the Service Network are one or more Service Routers, that are themselves responsible for transparently bridging between federated Service Segments. The Service Routers determine where services reside in the Service Network and, based on routing information gathered through interaction with other Service Routers, Network Routers and other mechanisms (e.g., network routing protocols, and Web Service addressing protocols), deliver service requests, using optimal routes, from a source Service Segment to the target Service Segment.

In accordance with an embodiment Service Routers focus on the header of the service requests, since they are only concerned about routing to a given service segment. As such, there is no need to unpack the message, and they have very low latency. Service Routers can be provided in a number of different packaging schemes, including service-aware network appliances.

Working in concert with the Service Router, an Enterprise Service Bus (ESB) at a particular service segment can abstract the location of services within that service segment, and hide the existence of the Service Network (in particular, the Service Routers) from service requesters. If compared to the analogy of computer network technology, then in accordance with an embodiment the ESB can be considered to play the role of a Service Switch that controls the routing (switching) within a federated Service Segment. The Service Switch is then in charge of delivering service requests to a particular service implementation running within the Service Segment controlled by the Service Switch. If a service is not within the Service Segment, then the Service Switch communicates with a Service Router to ensure proper routing of service requests to the target service segment and target destination.

The following are some of the main issues and characteristics that are addressed or provided by the Service Network:

1. In accordance with some embodiments, the system can address the topology and scalability of a Service Naming Space. Segmentation can be used to divide the Service Naming Space into manageable federated Service Segments (i.e. Domains and/or Sub-domains). The model can follow that of the underlying structure of computer networks; another analogy that can be followed is that of a "metropolis", i.e. a mega-city with many public and private services distributed across the many city neighborhoods (in this instance the Service Segments or Service Sub-Domains).
2. Embodiments can provide a federated Service Registry, or other registry of services, that is capable of recording the information needed for the construction of the service naming space, routing addressing and additional data needed by Service Routers and Services Switches. (For example, the service registry can support the data transformation required for data canocalization, security requirements, etc.)
3. In accordance with some embodiments, the Service Routing can be designed to be capable of understanding the current conditions of the underlying computer network; for example, discovering alternate routing paths to deal with failures, or with changes in the service or network topology. In accordance with these embodiments, the Service Routers only need to understand service routing information, and then work with the underlying network routers.

4. Some embodiments support a Service Switching that is capable of abstracting the location of service instances within a particular Service Segment. Service Switches can route service requests based on the content of those requests. A Service switch can also perform other functions, such as transforming data from/to a canonical form, or perform filtering or security functions.

5. In accordance with some embodiments, Service Discovery and Service Resolution capabilities can be included, to support different authoritative sources (for example, UDDI), and protocols (for example, WS-Metadata Exchange, WS-Trust), in an extensible way.

6. Some embodiments can comprise configuration technologies that make it easier for an administrator to manage the Service Network.

7. Some embodiments can comprise Governance technologies that allow administrators to control and track problems in the different components of the Service Network.

FIG. 1 shows an illustration of a SOA development lifecycle, in accordance with an embodiment. As shown in FIG. 1, in a SOA-based application development environment 50, groups of architects 52, business analysts 54, developers 56, and deployment teams 58 can all participate in a circular manner to design, implement, and update SOA applications and services that are used or that form part of the applications. Some of these applications will be designed to be service providers, while some will be designed to be service consumers, and others may act both as both service providers and service consumers. The SOA development process is largely circular, which allows applications to be quickly adapted to suit changing business needs. In accordance with an embodiment, information about the applications and the services they provide or use can be stored in a repository 60. As applications are developed, the repository information can be changed to reflect the applications and services for a particular site, project, department, or organization.

While SOA continues to be adopted by an increasing number of enterprises as a transformational approach to business agility, the typical deployment approach is still often one of creating silos of services that are centered around one or more related composite applications, and that are in turn made up of a limited number of shared services. This by itself does not provide the agility that is often sought by corporate enterprises, and is typically a result of organizational, political, and geographically boundaries. The original notion of Enterprise Service Bus (ESB) technology was an intention to link services from all over a virtual enterprise, to allow greater sharing of services and thus greater agility. However, recent deployment trends have been not so much as deploying an enterprise-wide bus structure, but rather to deploy neighborhoods of services.

The Service Network approach recognizes that it is necessary to link these neighborhoods of services into a network of services, in order to achieve the level of sharing that will then result in reduction in costs, greater efficiency, better utilization of resources, and greater agility. While the ESB approach can be expanded to include distributed bus Service Segments, that approach continues to be based on a point-to-point approach, wherein only a limited number of paths exist between each of the neighborhoods of services, and wherein the paths must be manually configured and constantly maintained. Oftentimes, queued message transports are used in order to achieve the resiliency. However, a failure in any intermediary can result in service disruption due to the inability of the ESB to utilize alternative paths to the target service. To address this, in accordance with an embodiment the Service Network provides a network-based approach to routing, wherein the infrastructure between ESB instances, or between Service Segments, can adopt an adaptive routing approach that is based on the cost of using a path, its availability, its Quality of Service metrics, and other criteria. The underlying logical infrastructure or "fabric" of the Service Network is thus more akin to that of the Internet, and less like that of a traditional message bus. The Service Network fabric can thus be designed to support the ability to perform adaptive routing without the need for each possible path between Service Segments to be configured, and without a need for complicated routing tables to be manually maintained.

Figure 2:
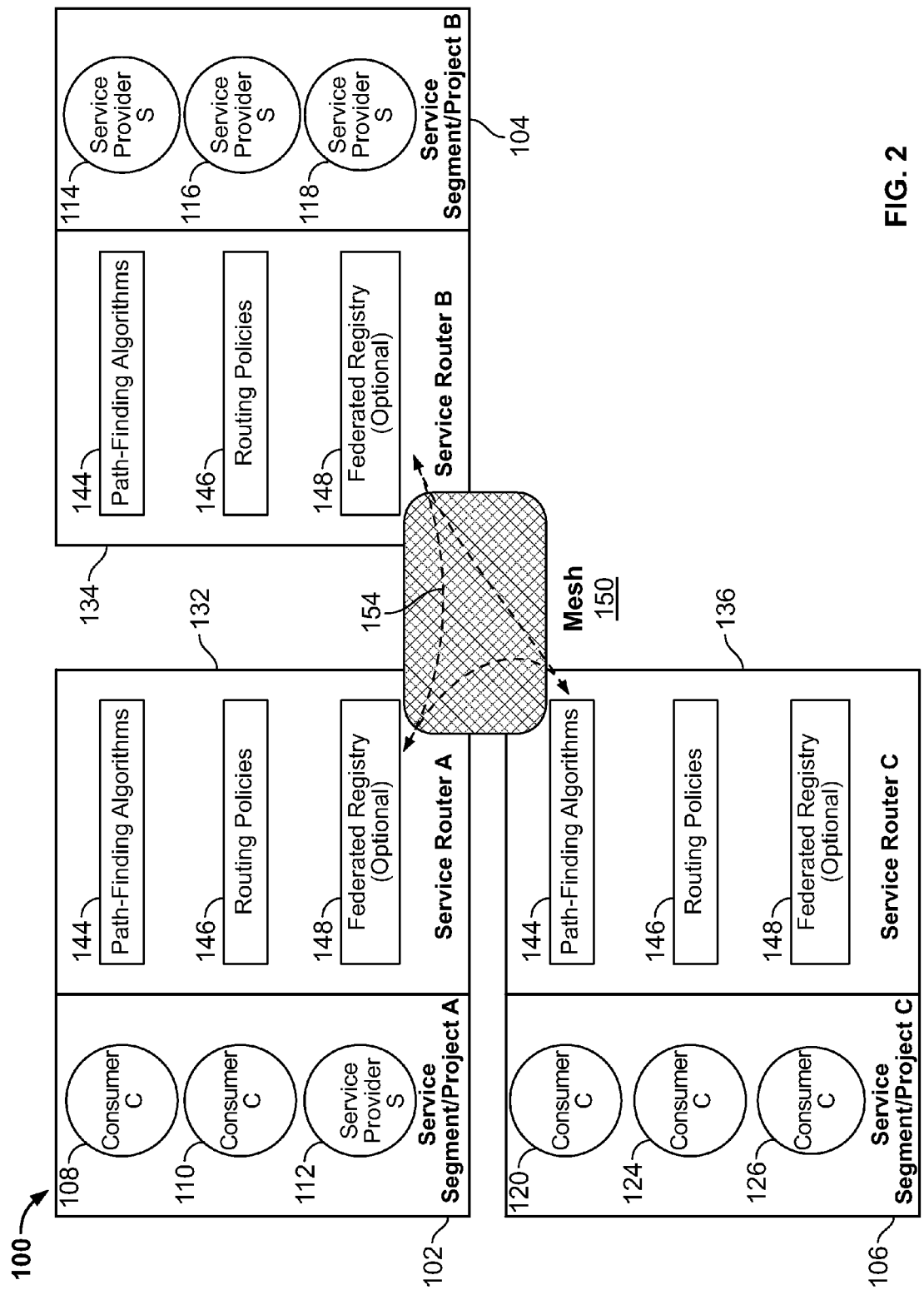
FIG. 2 shows an illustration of a system or infrastructure that comprises a Service Router, in accordance with an embodiment.

FIG. 2 shows an illustration of a system or infrastructure that comprises a Service Router, in accordance with an embodiment. As shown in FIG. 2, in accordance with an embodiment, the infrastructure 100 comprises a plurality of Service Segments or projects 102, 104, 106. Each of the Service Segments can include one or more service consumers 108-126 (represented as "C" in FIG. 2 and in later figures), and/or service providers (represented as "S" or by numerals 1-16 in FIG. 2 and in later figures). Depending on the implementation, a service consumer can be either a pure consumer of services, or may also act at times as a service provider. Similarly, depending on the implementation, a service provider can be either a pure provider of services, or may also act at times as a service consumer. Each Service Network, network neighborhood, or domain, further comprises a Service Router 132, 134, 136 associated therewith. The Service Router is responsible for knowing which services are presently being provided by its neighborhood of service providers, and can include additional features such as path-finding algorithms 144, routing policies 146, and in some embodiments an optional federated registry 148, each of which are described in further detail below. A mesh or mesh network 150 provides to link the Service Routers, and allow them to communicate, chat, and pass requests 154 from one to another. In accordance with some embodiments, the mesh itself can be either a full mesh (in which instance each of the routers are aware of each other router), or a partial mesh (in which instance each of the routers is aware of at least one other router, but not necessarily every router). As the Service Network grows larger, typically partial mesh provide performance benefits.

Mesh networks include capabilities that provide a good basis for delivering the logical infrastructure or fabric of the Service Network. In accordance with an embodiment, the mesh network can utilize a path-finding algorithm, such as Dijkstra's path-finding algorithm. The Dijkstra algorithm is a well-understood algorithm that is often used by Internet Routers to determine the shortest and most appropriate path or route between a pair of Internet networks. As used herein, the Dijkstra algorithm can be used (and/or other algorithms), by the Service Routers to determine the shortest and most appropriate path or route between a pair of Service Segments.

In addition to the Dijkstra algorithm and other path-finding algorithms, mesh networks can be used to provide additional context, such as transport type, route costing, hops, and other criteria that can be used in the determination of the most appropriate path from a service consumer to the requested endpoint. In accordance with an embodiment, the Service Router that interconnects with other Service Routers using the mesh network can be addressable directly from Enterprise Service Bus Service Segments as a service proxy. This makes it possible to significantly reduce the complexity involved in the establishment of distributed Enterprise Service Bus Service Segments, abstract the addressing complexities associated with the multiple point-to-point connections that must be established between Enterprise Service Bus Service Segments, and simplify ESB decisions about how to locate and route to a service, but allowing the Bus to answer the simple question: "Is the business service connected to the current segment directly or not?". If the business service is connected directly, then the Enterprise Service Bus can route the request directly to the target business services; otherwise it can route the request to the Service Router, which then determines the best path to target service and only needs to look at the header of the request. This separation of concerns approach results in significant performance improvements, since each hop in the route does not need to look into the request in order to determine routing information. The use of a mesh network also allows a particular application server provider to work with ESB and intermediary offerings from other vendors, allowing an organization to support much more heterogeneous environments.

In accordance with an embodiment, the Service Network approach can incorporate the use of an Enterprise Service Bus (ESB) or another type of service bus within a service segment. In these embodiments, the service bus can view or determine the services that exist in their service segment or neighborhood. By analogy, this is similar to a network switch that one might use in their home to connect their home network to the Internet. Within a particular service segment or neighborhood, the resources, or the segment as a whole, may be a source or a destination for a particular service or type of service request. When a request is sent from a consumer in the service segment, from the consumers perspective the request is sent out into a service cloud, similar to that of the Internet, but in this instance provided by the mesh network. The Service Router that is local to the consumer can determine whether to forward the request outside the segment, and if so, which next Service Router will be optimal for handling the request, or forwarding the request on again to yet another router.

In accordance with an embodiment, the Service Network approach takes into account the fact that it is not always optimal to use a direct or straight path from one Service Router to another Service Router. The Service Network and the Service Routers must cooperate to determine the optimal path for that service request. Algorithms such as Dijkstra's shortest-path algorithm, routing policies, and the use of either fully mesh (every Service Router connected to one another) or partial mesh networks can all be configured to best handle certain requests. For example, in some implementations it is possible that the same service is offered at the same time by multiple service providers, however, a first service provider is easily accessible over a fast T1-based Internet connection, whereas the second service provider is accessible only over a slower dial-up Internet connection. In the context of the Service Network, these service providers can be considered to be on different Service Segments. In these instances, the Service Network and the Service Routers must decide which of the service providers (Service Segments) to use to handle a particular request, and to best satisfy that request from a SOA perspective. If the SOA application has been designed to complete the service request within a particularly short period of time (e.g., milliseconds), then it may be more important to route the request on a path to the first service provider. If alternatively the SOA application has been designed to complete the request within a relatively longer period of time (e.g. minutes, or days), then there may be benefits in routing the request on a path to the second service provider.

In accordance with an embodiment, the path finding to the destination or target service segment can be based simply on adjacency, i.e. which destination Service Router is closest to the consumer's own Service Router. In other embodiments, the context of the request can be taken into account, and a path chosen that is based on the weight associated with each path from a SOA perspective; together with algorithms such as the Dijkstra algorithm; the calculated cost to follow that route; and any additional parameters. In accordance with an embodiment, the Service Routers are responsible for performing these determinations, and then forwarding the request via the mesh network to the determined recipient service segment/Service Router, which then passes the request internally to the service provider in its segment (or to another Service Router in the mesh network). In this way the Service Routers do not need to know the full path to the destination service provider. In accordance with an embodiment, some routers can be designated as being smarter than others, i.e. they can store more route information. This can be considered similar to the use of primary and secondary DNS servers. In other embodiments, the routers can perform similarly to Open Shortest Path First (OSPF) routers, in that they build their own routing tables over time. In each instance the objective is to figure out a destination domain, and then let the local router figure out the exact address to the service.

In accordance with an embodiment, the Service Network can incorporate or use a Service Naming Registry. In some embodiments, the Service Naming Registry can also be optionally distributed, duplicated or federated throughout the Service Network using a convergence algorithm, to allow the routing information in the Service Network to "converge", and to ensure that each router has a consistent view of the topology of the network. In these embodiments, the Service Routers still maintain their transparent nature, and act as a proxy, reading header information for each request (although not the content of each request). As the Service Routers chat with one another over time, they also use advertisements to perform a lightweight update of each other's local Registry. In accordance with an embodiment of the convergence algorithm, each Service Router maintains within its local Registry information about other Service Routers, including the identification of each router, its attached service networks and domains, and their relative costs. In most instances the Service Routers do not need to tell each other of the existence or whereabouts of each other router; instead they generally inform the other routers in the Service Network of any other Service Routers that they are immediately adjacent to. To populate the registry, each Service Router can initially use a flooding or other means to send out, and to receive, advertisements about their own local Service Network. As the Service Router then receives other advertisements from other routers, it can propagate those advertisements to its neighboring routers, and so on throughout each region of the Service Network. The cumulative advertisements can be gathered into a local database or a local Registry at each router. By synchronizing or otherwise communicating the local Registry information between all neighboring routers (i.e. creating the Service Naming Registry), each router can include each other router's information in its local database. Therefore, every Service Router eventually will have substantially the same local Registry information, and the same view of the Service Network. Using this form of updating, the Service Routers are able to begin with a cold or empty directory space, and then through discovery, build their information about neighboring Service Routers. They do not need to maintain information about Service Routers beyond their neighboring Service Routers (i.e. further hops), since forwarding from that point on can be handled by that Service Router. As described above, entries within a Service Router's routing table or local Registry can be optimized using the Dijkstra algorithm, or another algorithm, to determine the paths with the lowest accumulated cost to each service network. As also described above, routing policies can also be used to coerce Service Routers to prefer certain Service Routers over others, for handling particular requests, or servicing particular SOA needs.

Figure 3:
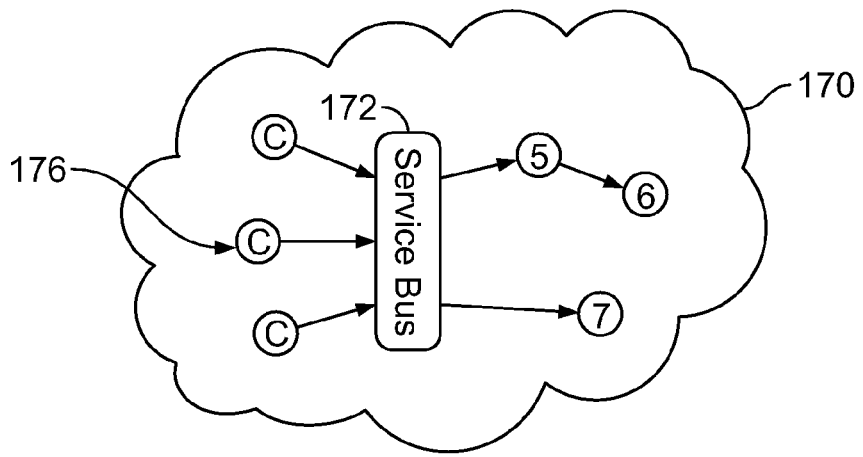
FIG. 3 shows an illustration of a system or infrastructure that comprises consumers, service providers, and a local service bus, in accordance with an embodiment.

FIG. 3 shows an illustration of a system or infrastructure that comprises consumers, service providers, and a local service bus, in accordance with an embodiment. As shown in FIG. 3, within a particular project 170, that may include applications being developed, a service bus 172 can be use to provide access from consumers 176 to services (indicated in FIG. 3 and in the following examples by numerals 1-12). In this example, services 5 and 7 are to be designated as shared services, while service 6 is to be designated an unshared service).

Figure 4:
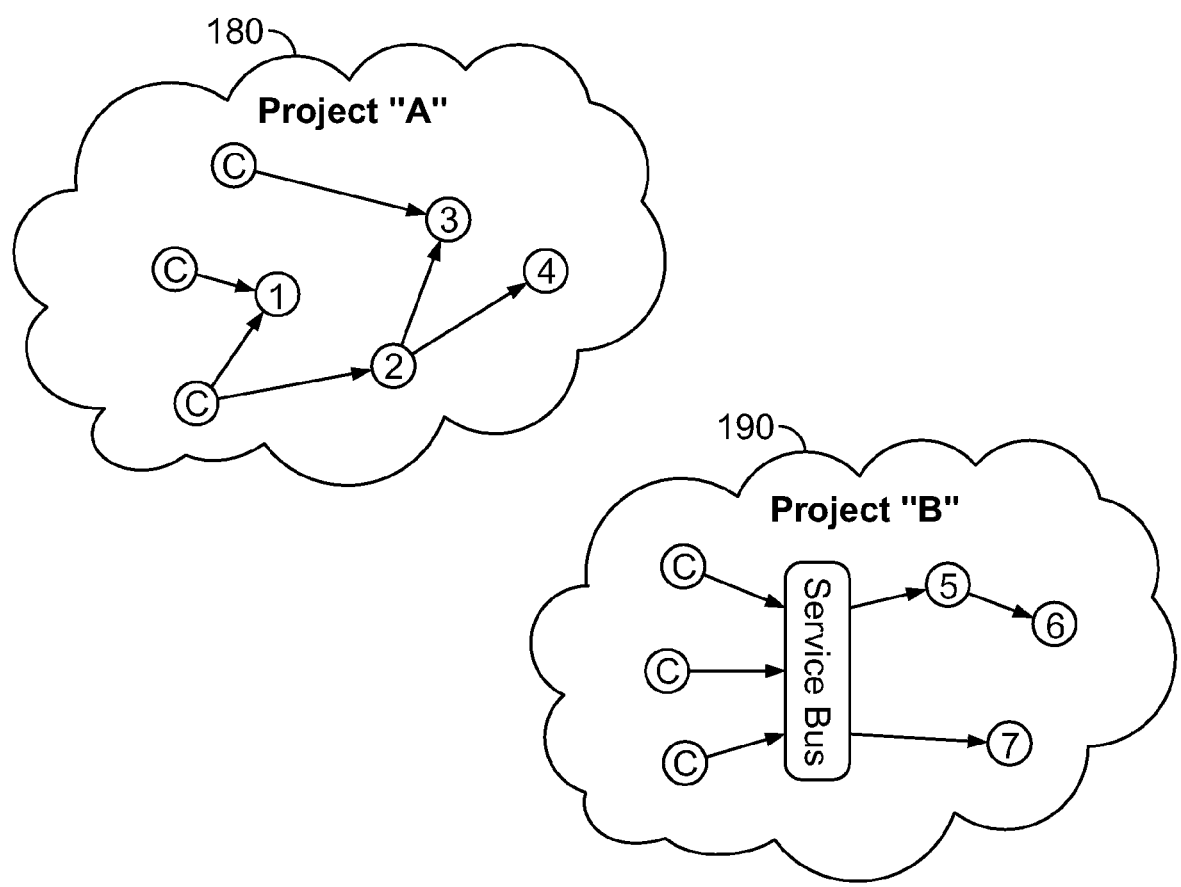
FIG. 4 shows an illustration of a system or infrastructure that comprises two or more projects, in accordance with an embodiment.

FIG. 4 shows an illustration of a system or infrastructure that comprises two or more projects 180, 190, in accordance with an embodiment. As shown in FIG. 4, a first project A 180 can be developed with consumers and services, and with or without the use of a service bus. Similarly, a second project B 190 can be developed with consumers and services, again with or without the use of a service bus. In this example, services 1, 2, 3, 5 and 7 are designated as shared services, while services 4 and 6 are designated as unshared services.

Figure 5:
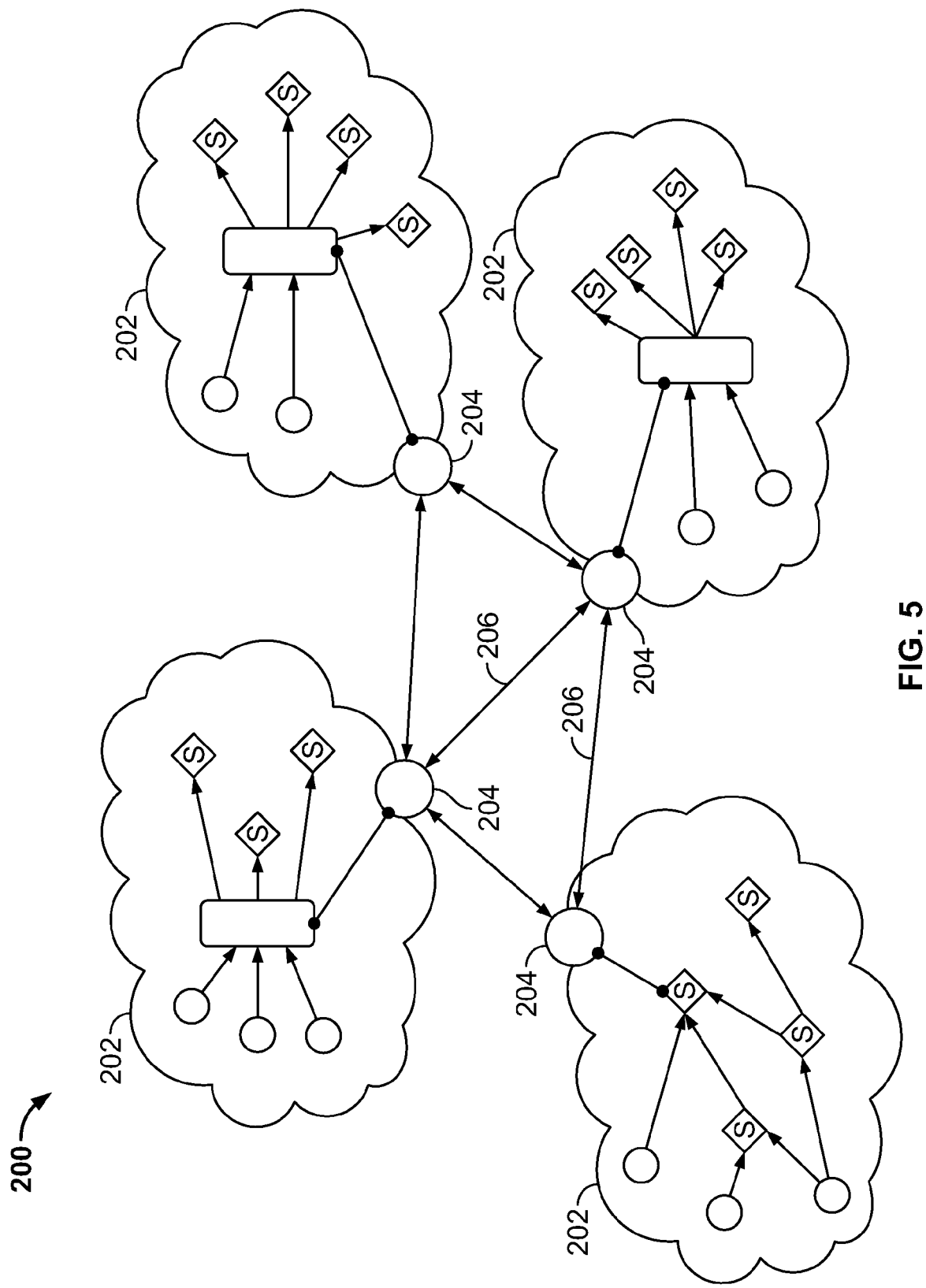
FIG. 5 shows an illustration of a system or infrastructure that comprises a plurality of projects that can use a point to point connection, in accordance with an embodiment.

FIG. 5 shows an illustration of a system or infrastructure that comprises a plurality of projects 200 that can use a point to point connection, in accordance with an embodiment. As shown in FIG. 5, if a Service Network is not used, then each Service Network, domain, or sub-domain 202 can includes a service access point 204. The service access point allows a Service Network, domain, or sub-domain to forward service requests 206 to another Service Network, domain, or sub-domain. However, as described above, as an enterprise begins to leverage the power of Service Oriented Architecture and attempts to share services located in different compartments such as those shown in FIG. 5, they find themselves faced with the task of having to configure a considerable amount of low-level infrastructure, typically in the form of queues that are necessary to interconnect the various Service Bus instances. The multi hop scenarios that are required typically in turn require that the operations staff of multiple components must jointly share the routing capabilities and results in a situation where the impact of a failure or overload condition in an intermediary compartment is felt across the enterprise.

Figure 6:
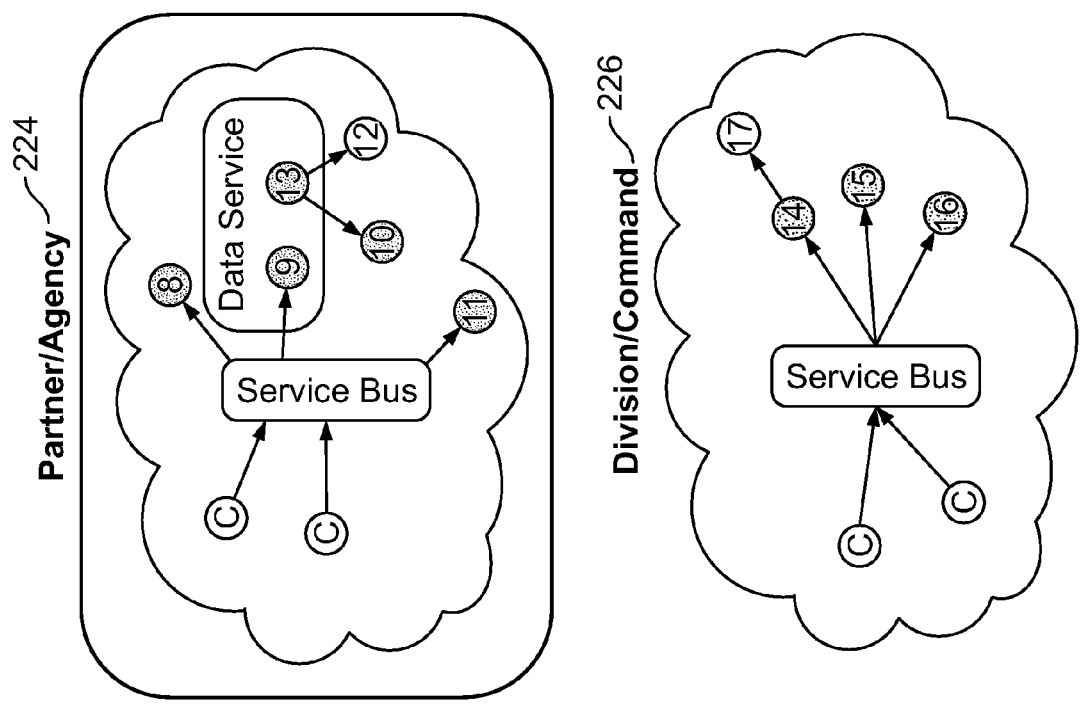
FIG. 6 shows an illustration of a system or infrastructure that comprises a plurality of projects, including services at different organizations, in accordance with an embodiment.
Figure 6:
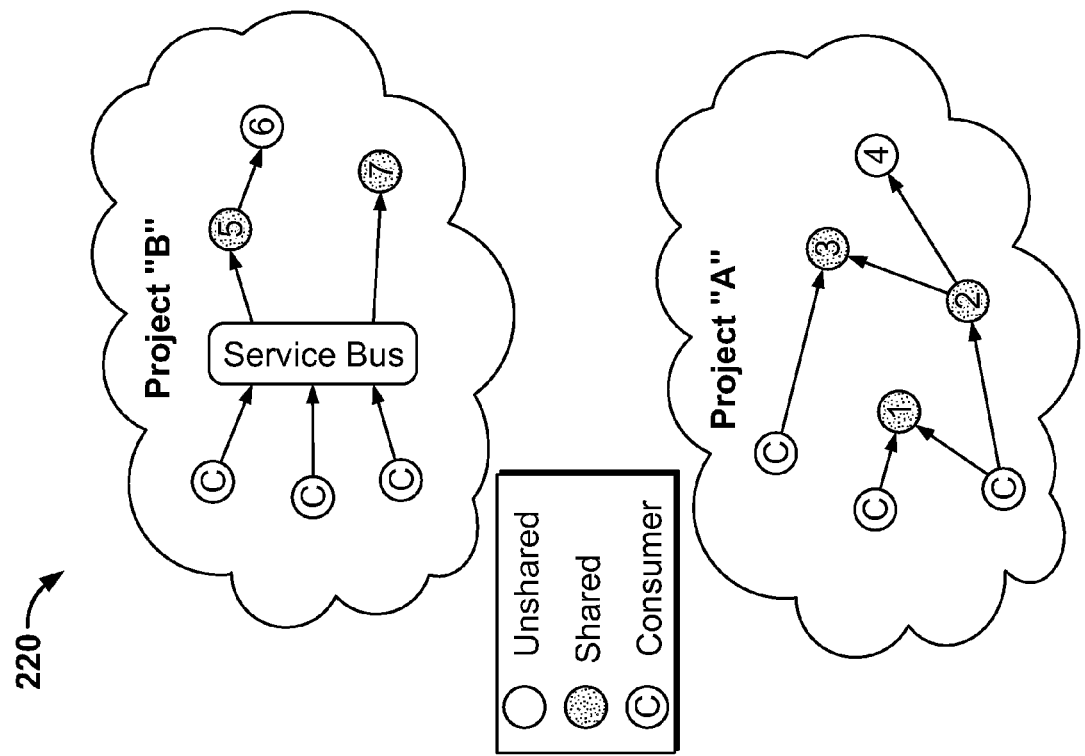

FIG. 6 shows an illustration of a system or infrastructure 220 that comprises a plurality of projects, including services at different organizations 224, 226, in accordance with an embodiment. External organizations, such as business partners 224, or each division of a company 226, can also have their own set of services, or in the context of the present disclosure, their own Service Network.

Figure 7:
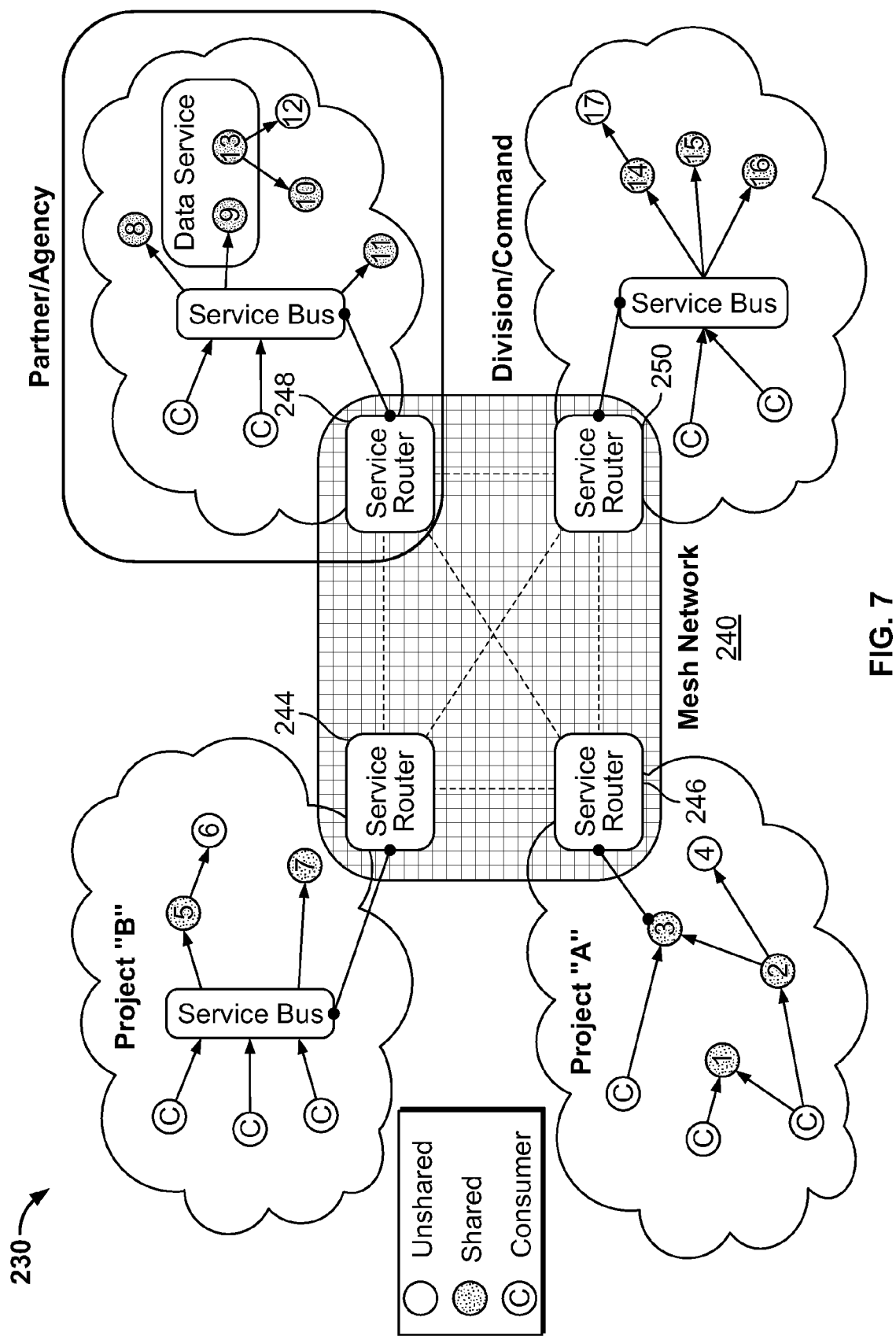
FIG. 7 shows an illustration of a system or infrastructure that comprises a mesh or mesh network, and can be used to broker services between different organizations, in accordance with an embodiment.

FIG. 7 shows an illustration of a system or infrastructure 230 that comprises a mesh or mesh network 240, and can be used to broker services between different organizations, in accordance with an embodiment. As shown in FIG. 7, each of the Service Network, domain, or sub-domain includes a Service Router 244-250 associated therewith. The Service Router allows a Service Segment, domain, or sub-domain to forward service requests to another Service Segment, domain, or sub-domain. As also shown in FIG. 7, the Service Routers communicate with each other as part of a mesh network. The mesh network shown in FIG. 7 is a fully mesh network, in that each Service Router appears to have communication with each other Service Router in the network. However, in many instances, and particularly as the number of Service Routers increase, it is desirable to use a partial mesh network, so that each Service Router has communication with only one or several other Service Routers in the network. As also shown in FIG. 7, in addition to each of the Service Network, domain, or sub-domain including a Service Router, additional divisions can also have their own Service Network, domain, or sub-domain including a Service Router. External organizations, such as business partners can also have their own Service Segment, domain, or sub-domain including a Service Router. Some or all of these Service Segments, domains, or sub-domains can include a service bus, or another form of data service. The Service Router allows Service Segments, domains, or sub-domains to forward service requests from one organization to another organization, or to other external data sources. This type of external service communication cannot be supported by the service bus alone.

Figure 8:
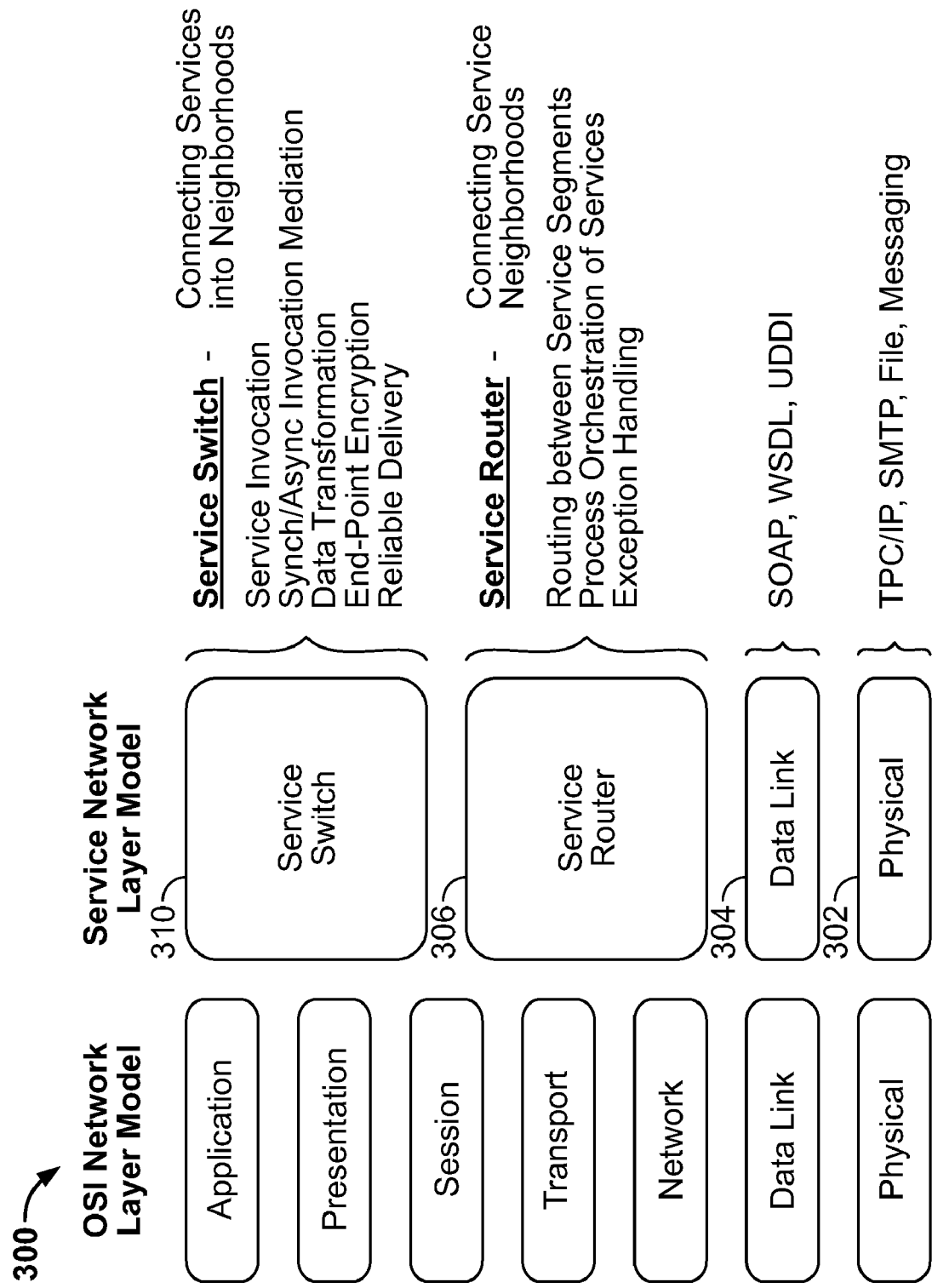
FIG. 8 shows an illustration of a Service Network layer model, in accordance with an embodiment.

FIG. 8 shows an illustration of Service Network layer model 300, in accordance with an embodiment. As shown in FIG. 8, in accordance with an embodiment the Service Network layer model can be constructed similar to, for example, the OSI network layer model. In this embodiment, the Physical layer 304 can be the same as the corresponding OSI physical layer, for example TCP/IP, SMTP, or another file transfer protocol. The Data Link layer 304 can also be the same as the corresponding OSI data link layer, for example SOAP, or WSDL. The next logically higher layer is the Service Router layer 306, which provides routing between Service Segments, and process orchestration. In accordance with an embodiment the Service Router layer can be constructed similarly to the network, transport, and session layers of the OSI model. The logically highest or topmost layer is the Service Switch layer 310, which provides service invocation, service mediation, data transformation, end-point encryption, and reliable delivery. In accordance with an embodiment the Service Router layer can be constructed similarly to the session, presentation, and application layers of the OSI model.

Figure 9:
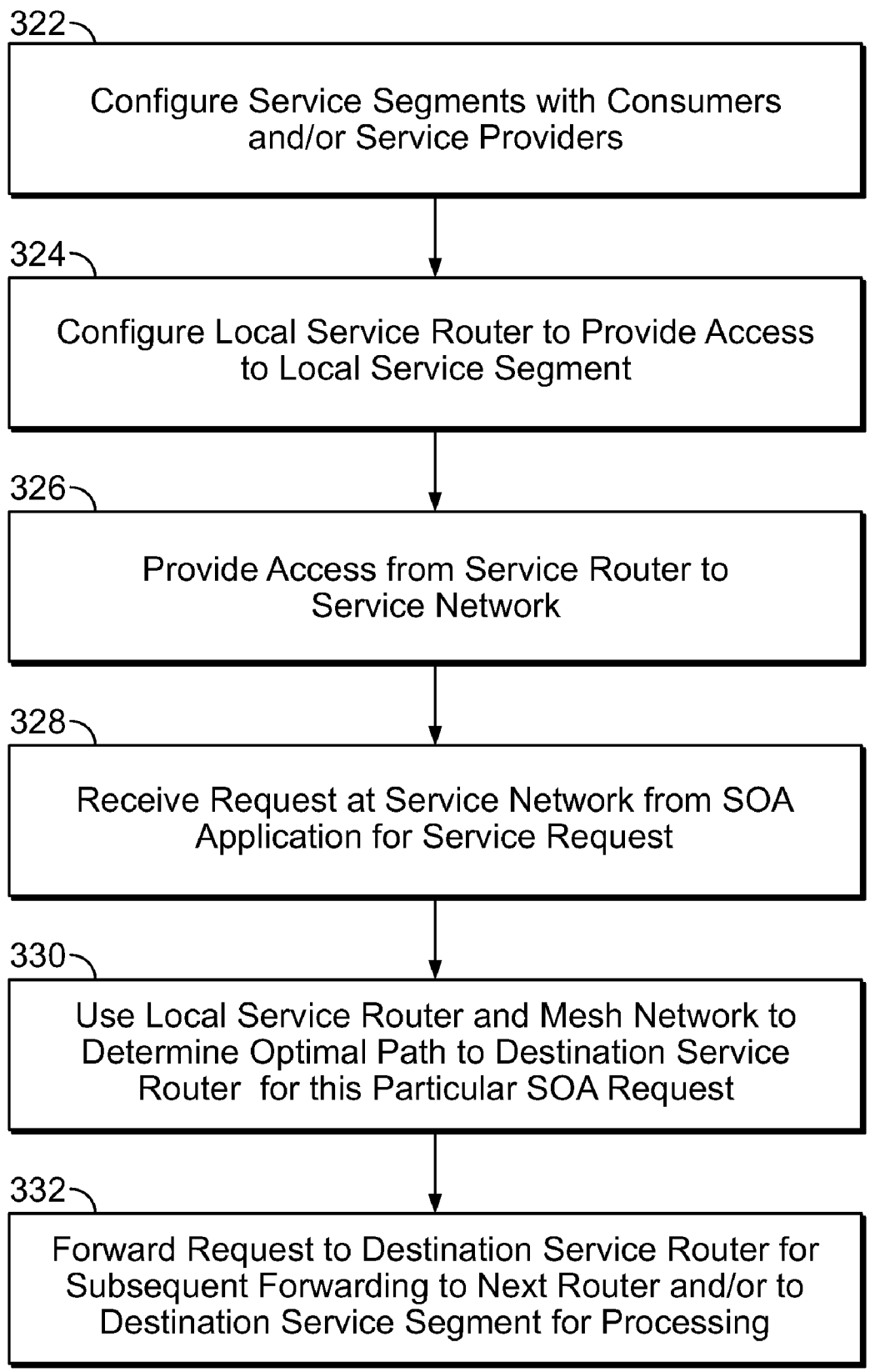
FIG. 9 shows a flowchart of a Service Network method, in accordance with an embodiment.

FIG. 9 shows a flowchart of a Service Network method, in accordance with an embodiment. As shown in FIG. 9, in step 322, individual Service Segments are configured with SOA applications that can be service consumers and/or service providers. As described above, external organizations, such as business partners can also have their own Service Segment or Service Network. In step 324, the local Service Router at each Service Segment is configured to provide access to the service providers and services in the local Service Segment. In step 326, access is provided from each Service Router to the Service Network infrastructure. In step 328, the infrastructure receives service requests at the Service Network from SOA applications, for subsequent processing by service providers. The Service Router is responsible for knowing which services are presently being provided by its neighborhood of service providers, and can include additional features such as path-finding algorithms, routing policies, and in some embodiments an optional federated registry, each of which are described in further detail below. The Service Routers do not need to know the full path to the destination service provider. However, the Service Routers do not need to know the full path to the destination service provider, or the content of the request. Instead, the Service Router only needs to look at the header of the request, and know which next hop Service Router should receive the request. In step 330, the local Service Router and mesh network is used determine an optimal path to the destination Service Router for this particular SOA request. In step 332, the request is forwarded to the destination Service Router, for subsequent forwarding to the next Service Router and/or to the destination Service Segment for processing.

As described above, the Service Network technology can have a profound impact on an enterprise, and potentially the entire computer industry. Depending on the particular implementation, plugging into the Service Network can be as simple as providing a computer with access to the Internet. In accordance with some embodiment, the many components of a Service Network can be sourced from different vendors, and in many forms. For example, Service Routers can be implemented as hardware appliances and sold by networking companies; many of these companies already provide XML-based appliances for use as firewalls or specialized routing devices. Service Switching (and Service Bus) products are already available from different vendors and in the open source community. These products can be adapted to address the requirements of the Service Network.

Figure 10:
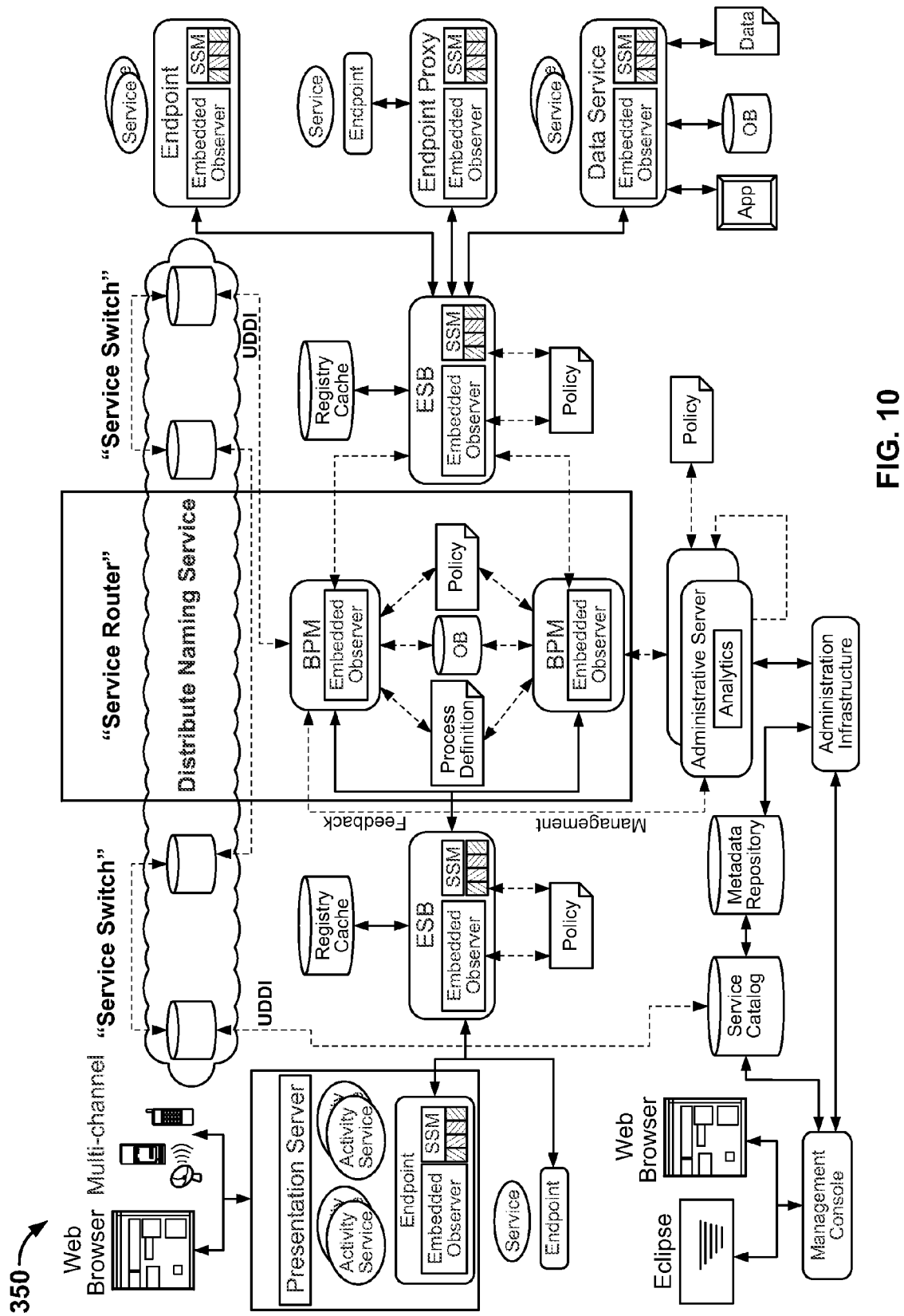
FIG. 10 shows an illustration of how the Service Network can be incorporated into an application server environment, in accordance with an embodiment.

FIG. 10 shows an illustration of how the Service Network can be incorporated into an application server environment, in accordance with an embodiment. As shown in FIG. 10, the Service Network approach can be incorporated or used with an application server environment such as the WebLogic application server and/or the Aqualogic suite from BEA Systems, Inc. As shown in FIG. 10, the application server environment 350 can comprise a Service Router that includes an administrative infrastructure, administrative server, and BPM framework. Service Switches provide communication between different components of the Aqualogic suite, for example from the Web Browser, and management components, to SOA service endpoints. The Service Router can also enable communication via the Service Network and mesh to other entities and organizations. In accordance with some embodiments, a distributed naming service, federated naming service, or other registry of services is provided, that is capable of recording the information needed for the construction of the service naming space, routing addressing and additional data needed by Service Routers and Services Switches, (for example, any data transformation required for data canocalization, security requirements, etc.)

The present invention may be conveniently implemented using a conventional general purpose or a specialized digital computer, microprocessor, or computer network or server, programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, it will be evident that while some of the examples above are described with reference to a WebLogic or Aqualogic implementation, it will be evident that the technologies and features of the Service Network, Service Router, Service Switch, and mesh network can be also used with other application servers, servers, and computer resources.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for supporting service networks in a service oriented architecture (SOA) environment, comprising:
   a service network including a plurality of service segments; and
   a plurality of service routers in the service network, including a service router associated with each service segment, wherein each of the plurality of service routers comprises
      a routing table or registry that includes the information about a local topology of other service routers within the service network, and
      information describing service-oriented architecture performance cost or other quality of service factors associated with using a particular path to one or more of the other service routers, and
   wherein each service router is responsible for transparently bridging service requests from applications between the service segments, including
      maintaining information about the local topology of other service routers, including maintaining local registry information about other service routers that are adjacent to the service router, including the identification of each router, its attached service networks and domains, and their relative costs, and wherein to populate the local registry, each service router sends and receives advertisements about their own local service segments, which advertisements are then used to populate the local registry at each service router,
      providing a physical layer and a data link layer, which each service router uses to communicate with other service routers,
      providing a service router layer logically above the physical layer and data link layer which each service router uses to route service requests between service segments associated with the other service routers,
      receiving a service request from an application having service-oriented architecture requirements,
      determining where services reside in the service network, based on a routing information gathered through interaction with other service routers, network routers and other mechanisms including advertisements from the other service routers in the local topology describing the services provided by their local service segments, and
      delivering, for each particular requestor or service request, the service requests, using optimal routes, and by interim hops of service routers as necessary, to a target service segment that will best satisfy the service-oriented architecture requirements of that particular requestor or service request.

2. The system of claim 1, wherein one or more of the plurality of service segments includes an enterprise service bus that handles service requests that are local to the service segment, including determining whether a requested service is provided by the service segment, and then
    if the requested service is provided by the service segment then forwarding the service request to a service provider within the service segment, and
    if the requested service is not provided by the service segment, then acting as a switch to forward the service request to the service router associated with the service segment, for subsequent forwarding to the target service segment.

3. The system of claim 1, wherein each service router uses a routing information that includes a path-finding algorithm for determining as an optimal route the lowest cost path to the target service router, and wherein the lowest cost path to the target service router can include interim service routers or hops.

4. The system of claim 1, wherein the service routers associated with each of the plurality of service segment communicate using one of a full or a partial mesh network.

5. The system of claim 1, wherein at each hop the service router receiving the service request
    reads a header information in the service request,
    determines using the header information if the service request is destined for its local service segment, and
        if the service request is destined for its local service segment then communicating the service request to its local service segment, and
        if the service request is not destined for its local service segment then forwarding the request to a next hop server router as defined by its local topology of other service routers.

6. A method for supporting service networks in a service oriented architecture (SOA) environment, comprising:
    delivering service requests within a service network which includes a plurality of service segments, using a plurality of service routers, including a service router associated with each service segment, wherein each of the plurality of service routers comprises a routing table or registry that includes the information about a local topology of other service routers within the service network, and information describing service-oriented architecture performance cost or other quality of service factors associated with using a particular path to one or more of the other service routers, and wherein each service router is responsible for transparently bridging service requests from applications between the service segments, including
        maintaining information about the local topology of other service routers, including maintaining local registry information about other service routers that are adjacent to the service router, including the identification of each router, its attached service networks and domains, and their relative costs, and wherein to populate the local registry, each service router sends and receives advertisements about their own local service segments, which advertisements are then used to populate the local registry at each service router,
        providing a physical layer and a data link layer, which each service router uses to communicate with other service routers,
        providing a service router layer logically above the physical layer and data link layer which each service router uses to route service requests between service segments associated with the other service routers,
        receiving a service request from an application having service-oriented architecture requirements,
        determining where services reside in the service network, based on a routing information gathered through interaction with other service routers, network routers and other mechanisms including advertisements from the other service routers in the local topology describing the services provided by their local service segments, and
        delivering, for each particular requestor or service request, the service requests, using optimal routes, and by interim hops of service routers as necessary, to a target service segment that will best satisfy the service-oriented architecture requirements of that particular requestor or service request.

7. The method of claim 6, wherein one or more of the plurality of service segments includes an enterprise service bus that handles service requests that are local to the service segment, including determining whether a requested service is provided by the service segment, and then
    if the requested service is provided by the service segment then forwarding the service request to a service provider within the service segment, and
    if the requested service is not provided by the service segment, then acting as a switch to forward the service request to the service router associated with the service segment, for subsequent forwarding to the target service segment.

8. The method of claim 6, wherein each service router uses a routing information that includes a path-finding algorithm for determining as an optimal route the lowest cost path to the target service router, and wherein the lowest cost path to the target service router can include interim service routers or hops.

9. The method of claim 6, wherein the service routers associated with each of the plurality of service segment communicate using one of a full or a partial mesh network.

10. The method of claim 6, wherein at each hop the service router receiving the service request
    reads a header information in the service request,
    determines using the header information if the service request is destined for its local service segment, and
        if the service request is destined for its local service segment then communicating the service request to its local service segment, and
        if the service request is not destined for its local service segment then forwarding the request to a next hop server router as defined by its local topology of other service routers.

11. A system for supporting service networks in a service oriented architecture (SOA) environment, comprising:
    a service network including a plurality of service segments; and
    a plurality of service routers in the service network, including a service router associated with each service segment, wherein each service router is responsible for transparently bridging service requests from applications between the service segments, including
        maintaining information about a local topology of other service routers,
        providing a physical layer and a data link layer, which each service router uses to communicate with other service routers,
        providing a service router layer logically above the physical layer and data link layer which each service router uses to route service requests between service segments associated with the other service routers,
        receiving a service request from an application having service-oriented architecture requirements, determining where services reside in the service network, based on a routing information gathered through interaction with other service routers, network routers and other mechanisms including advertisements from the other service routers in the local topology describing the services provided by their local service segments, and delivering, for each particular requestor or service request, the service requests, using optimal routes, and by interim hops of service routers as necessary, to a target service segment that will best satisfy the service-oriented architecture requirements of that particular requestor or service request; and wherein each of the plurality of service routers comprises a routing table that includes the information about a local topology of other service routers within the service network;

a routing policy that includes information describing service-oriented architecture performance cost or other quality of service factors associated with using a particular path to one or more of the other service routers; and means for providing the physical layer and a data link layer, which the service router uses to communicate with the other service routers, providing the service router layer logically above the physical layer and data link layer which the service router uses to route service requests between service segments associated with the other service routers, receiving the advertisements from the other service routers describing services that are being provided by their local service segments, receiving the service requests from service requestors having service-oriented architecture requirements, on a local service segment that is local to the service router, determining, for each particular requestor or service request, a target service segment within which the requested services reside in the service network that will best satisfy the service-oriented architecture requirements of that particular requestor or service request, and, based on both the information in the routing table and the information in the routing policy, delivering the service requests from the service router to the target service segment.

12. The system of claim 11, wherein one or more of the plurality of service segments includes an enterprise service bus that handles service requests that are local to the service segment, including determining whether a requested service is provided by the service segment, and then if the requested service is provided by the service segment then forwarding the service request to a service provider within the service segment, and if the requested service is not provided by the service segment, then acting as a switch to forward the service request to the service router associated with the service segment, for subsequent forwarding to the target service segment.

13. The system of claim 11, wherein each service router uses a routing information that includes a path-finding algorithm for determining as an optimal route the lowest cost path to the target service router, and wherein the lowest cost path to the target service router can include interim service routers or hops.

14. The system of claim 11, wherein the service routers associated with each of the plurality of service segment communicate using one of a full or a partial mesh network.

15. A method for supporting service networks in a service oriented architecture (SOA) environment, comprising the steps of:

delivering service requests within a service network which includes a plurality of service segments, using a plurality of service routers, including a service router associated with each service segment, wherein each service router is responsible for transparently bridging service requests from applications between the service segments, including maintaining information about a local topology of other service routers, providing a physical layer and a data link layer, which each service router uses to communicate with other service routers, providing a service router layer logically above the physical layer and data link layer which each service router uses to route service requests between service segments associated with the other service routers, receiving a service request from an application having service-oriented architecture requirements, determining where services reside in the service network, based on a routing information gathered through interaction with other service routers, network routers and other mechanisms including advertisements from the other service routers in the local topology describing the services provided by their local service segments, and delivering, for each particular requestor or service request, the service requests, using optimal routes, and by interim hops of service routers as necessary, to a target service segment that will best satisfy the service-oriented architecture requirements of that particular requestor or service request; and wherein each of the plurality of service routers comprises a routing table that includes the information about a local topology of other service routers within the service network;

a routing policy that includes information describing service-oriented architecture performance cost or other quality of service factors associated with using a particular path to one or more of the other service routers; and means for providing the physical layer and a data link layer, which the service router uses to communicate with the other service routers, providing the service router layer logically above the physical layer and data link layer which the service router uses to route service requests between service segments associated with the other service routers, receiving the advertisements from the other service routers describing services that are being provided by their local service segments, receiving the service requests from service requestors having service-oriented architecture requirements, on a local service segment that is local to the service router, determining, for each particular requestor or service request, a target service segment within which the requested services reside in the service network that will best satisfy the service-oriented architecture requirements of that particular requestor or service request, and, based on both the information in the routing table and the information in the routing policy, delivering the service requests from the service router to the target service segment.

16. The method of claim 15, wherein one or more of the plurality of service segments includes an enterprise service bus that handles service requests that are local to the service segment, including determining whether a requested service is provided by the service segment, and then
- if the requested service is provided by the service segment then forwarding the service request to a service provider within the service segment, and
- if the requested service is not provided by the service segment, then acting as a switch to forward the service request to the service router associated with the service segment, for subsequent forwarding to the target service segment.

17. The method of claim 15, wherein each service router uses a routing information that includes a path-finding algorithm for determining as an optimal route the lowest cost path to the target service router, and wherein the lowest cost path to the target service router can include interim service routers or hops.

18. The method of claim 15, wherein the service routers associated with each of the plurality of service segment communicate using one of a full or a partial mesh network.

19. A non-transitory storage medium including instructions stored thereon which when executed by a computer cause the computer to perform the steps comprising:
- delivering service requests within a service network which includes a plurality of service segments, using a plurality of service routers, including a service router associated with each service segment, wherein each of the plurality of service routers comprises a routing table or registry that includes the information about a local topology of other service routers within the service network, and information describing service-oriented architecture performance cost or other quality of service factors associated with using a particular path to one or more of the other service routers, and wherein each service router is responsible for transparently bridging service requests from applications between the service segments, including
- maintaining information about the local topology of other service routers, including maintaining local registry information about other service routers that are adjacent to the service router, including the identification of each router, its attached service networks and domains, and their relative costs, and wherein to populate the local registry, each service router sends and receives advertisements about their own local service segments, which advertisements are then used to populate the local registry at each service router,
- providing a physical layer and a data link layer, which each service router uses to communicate with other service routers,
- providing a service router layer logically above the physical layer and data link layer which each service router uses to route service requests between service segments associated with the other service routers,
- receiving a service request from an application having service-oriented architecture requirements,
- determining where services reside in the service network, based on a routing information gathered through interaction with other service routers, network routers and other mechanisms including advertisements from the other service routers in the local topology describing the services provided by their local service segments, and
- delivering, for each particular requestor or service request, the service requests, using optimal routes, and by interim hops of service routers as necessary, to a target service segment that will best satisfy the service-oriented architecture requirements of that particular requestor or service request.

* * * * *

UNITED STATES PATENT AND TRADEMARK OFFICE
CERTIFICATE OF CORRECTION

| | | |
|---|---|---|
| PATENT NO. | : 7,814,226 B2 | Page 1 of 1 |
| APPLICATION NO. | : 11/857988 | |
| DATED | : October 12, 2010 | |
| INVENTOR(S) | : Paul B. Patrick | |

It is certified that error appears in the above-identified patent and that said Letters Patent is hereby corrected as shown below:

In column 2, line 35, delete "requesters." and insert -- requestors. --, therefor.

In column 4, line 34, delete "requesters." and insert -- requestors. --, therefor.

Signed and Sealed this
Thirty-first Day of May, 2011

David J. Kappos
*Director of the United States Patent and Trademark Office*